(12) United States Patent
Ichiyama et al.

(10) Patent No.: US 9,398,180 B2
(45) Date of Patent: Jul. 19, 2016

(54) PORTABLE TERMINAL APPARATUS, INFORMATION PROCESSING APPARATUS, CHARACTER INPUT METHOD, AND RECORDING MEDIUM

(71) Applicant: Konica Minolta, Inc., Chiyoda-ku, Tokyo (JP)

(72) Inventors: Shohei Ichiyama, Toyokawa (JP); Yoichi Kurumasa, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/813,805

(22) Filed: Jul. 30, 2015

(65) Prior Publication Data

US 2016/0057297 A1 Feb. 25, 2016

(30) Foreign Application Priority Data

Aug. 22, 2014 (JP) .................................. 2014-169947

(51) Int. Cl.
| H04N 1/44 | (2006.01) |
| H04N 1/00 | (2006.01) |
| H04W 88/02 | (2009.01) |

(52) U.S. Cl.
CPC ....... *H04N 1/00392* (2013.01); *H04N 1/00488* (2013.01); *H04W 88/02* (2013.01); *H04N 2201/0039* (2013.01); *H04N 2201/0062* (2013.01); *H04N 2201/0094* (2013.01); *H04N 2201/0096* (2013.01)

(58) Field of Classification Search
USPC .................. 358/1.15, 1.14; 715/742; 345/168; 455/41.1
See application file for complete search history.

(56) References Cited

U.S. PATENT DOCUMENTS

| 2006/0107269 A1* | 5/2006 | Bantz .................... G06F 9/5077 719/310 |
| 2010/0162127 A1 | 6/2010 | Uchino |
| 2011/0029885 A1* | 2/2011 | Camenisch ......... G06F 3/04815 715/741 |
| 2014/0280981 A1* | 9/2014 | Singhal ................ H04L 67/142 709/227 |
| 2015/0044964 A1* | 2/2015 | Khan ...................... G06F 21/35 455/41.1 |
| 2015/0091804 A1* | 4/2015 | Ito ....................... G06F 3/04883 345/168 |
| 2015/0181050 A1* | 6/2015 | Nishii ................ H04N 1/00307 358/1.15 |

FOREIGN PATENT DOCUMENTS

JP 2010-146504 A 7/2010

* cited by examiner

*Primary Examiner* — Jerome Grant, II
(74) *Attorney, Agent, or Firm* — Buchanan Ingersoll & Rooney PC

(57) ABSTRACT

A portable terminal apparatus includes an access portion that enables access to an information processing apparatus; an image obtaining portion that obtains an image of a character input tool, a transmitter that transmits the image of the character input tool to the information processing apparatus; a receiver that receives touched key information from the information processing apparatus, and a character identification portion that identifies a character on the basis of the touched key information received by the receiver, wherein the image obtaining portion obtains a different image of the character input tool upon each change to a screen appearance of the character input tool or upon each receipt of the touched key information and the transmitter transmits the different image of the character input tool and character information to the information processing apparatus.

25 Claims, 9 Drawing Sheets

PORTABLE TERMINAL APPARATUS, INFORMATION PROCESSING APPARATUS, CHARACTER INPUT METHOD, AND RECORDING MEDIUM

This application claims priority under 35 U.S.C. §119 to Japanese Patent Application No. 2014-169947 filed on Aug. 22, 2014, the entire disclosure of which is incorporated herein by reference in its entirety.

BACKGROUND OF THE INVENTION

1. Field of the Invention

The present invention relates to a portable terminal apparatus such as a smartphone or a tablet computer terminal, an information processing apparatus such as a personal computer and a multifunctional digital image processing apparatus (i.e., a multi-function peripheral abbreviated as MFP) having printer function, facsimile function, scanner function, and other functions, a character input method, and a recording medium.

2. Description of the Related Art

The following description sets forth the inventor's knowledge of related art and problems therein and should not be construed as an admission of knowledge in the prior art.

Some information processing apparatuses such as image processing apparatuses as described above are known for their touch-panel display portions that display a screen having a character input area, allowing users to input a string in the character input area and start a predetermined process by pressing a start key. For example, users can input characters such as user names and passwords on a user name and password input screen to log onto and use such an information processing apparatus. Users also can input a string for string search.

Users conventionally have used a method as described below to input characters in a character input area.

Referring to FIG. 12, a screen D6 is displayed on a display 310 of an information processing apparatus 300; users press (touch) a character input area 321a, a character input area 321b, or a keyboard display key 322 on the screen D6. The screen then switches to a screen D7 of FIG. 12 and the screen D7 shows a character input tool 323 that is an original software keyboard installed on the information processing apparatus 300, as well as the character input areas 321a and 321b. Users input characters in the character input areas 321a and 321b by touching character keys of the character input tool 323.

This method, however, has a problem as described below. Users are unfamiliar to the character input tool 323 that is an original tool provided by the manufacturer of the information processing apparatus 300 and they need to make some efforts to learn use of it.

Users do not need to use the original character input tool 323 with a first technique, as described below, which is publicly known. In this character input method, users input characters in a character input area of the information processing apparatus by inputting characters on portable terminal apparatuses that they usually use, such as smartphones and tablet computer terminals.

More specifically, as illustrated in FIG. 12, the screen D7 shows the character input tool 323 that is an original keyboard, as well as the character input areas 321a and 321b. While the screen D7 is displayed on the display 310 of the information processing apparatus 300, users enable a wireless access, for example, between their portable terminal apparatuses and the information processing apparatus 300. On the screen, users press a start key (not shown in this figure) for starting an input method editor (IME) that is common character input assistant software for portable terminal apparatuses; the portable terminal apparatuses then display an IME-based character input tool that user usually use, on the displays. Meanwhile, the information processing apparatus 300 indicates on the display 310 that the IME is now active.

After inputting characters with the character input tool that they usually use by operating their portable terminal apparatuses, users submit the input characters; the portable terminal apparatuses then transfer the string to the information processing apparatus 300. Receiving the string from the portable terminal apparatuses, the information processing apparatus 300 puts it into the character input area.

There is a second technique, as described below, which is also publicly known. In this method, address data stored on their portable terminal apparatuses is transferred to the information processing apparatus 300 by operating the information processing apparatus; the information processing apparatus 300 converts the address data into a display format supported on the information processing apparatus 300 itself and displays it in a certain area on the display 310 of the information processing apparatus 300 itself. The "address data" here represents information stored on the portable terminal apparatuses, for example: names and email addresses.

Japanese Unexamined Patent Publication No. 2010-146504 suggests an information processing system that is capable of handling screen information by picture objects, the screen information being received from a remote terminal. The information processing system has one or more remote apparatuses each transmitting a screen image having a plurality of picture objects and picture area information representing areas of the screen image in which the plurality of picture objects are positioned. The information processing system also has a local terminal connected to the one or more remote apparatuses through a network, the local terminal receiving the image and the picture area information from the one or more remote apparatuses, clipping images out of the received image with reference to the received picture area information, the images corresponding to the plurality of picture objects, and displaying the clipped images on a display screen.

The technique disclosed in the Japanese Unexamined Patent Publication No. 2010-146504, however, has a problem as described below. With this technique, users need to display a character input tool of their portable terminal apparatuses on the displays of their portable terminal apparatuses by operating the information processing apparatus, need to input characters with the character input tool on their portable terminal apparatuses, then need to check the input characters on the information processing apparatus; in this way, they are bothered by going back and forth between their portable terminal apparatuses and the information processing apparatus. Users further need to start an IME of their portable terminal apparatuses from the information processing apparatus and to input characters from their portable terminal apparatuses, which is also troublesome.

With the second technique, as described above, address data stored on their portable terminal apparatuses is transferred to the information processing apparatus 300 by operating the information processing apparatus; the information processing apparatus converts the address data into a display format supported on the information processing apparatus itself and displays it in a certain area on the display of the information processing apparatus itself. This method has another problem as described below. Although users can finish various operations, for example: selecting an address from the address data stored on their portable terminal apparatuses and performing a flick gesture, only by operating the information processing apparatus, users still need to use a character input tool other than an IME-based character input installed on their portable terminal apparatuses because the information processing apparatus is not allowed to display the IME-based character input tool on its display.

The technique disclosed in the Japanese Unexamined Patent Publication No. 2010-146504 also has another problem. With this technique, the information processing apparatus is not allowed to access functions of the portable terminal apparatuses but only allowed to display picture objects stored on the portable terminal apparatuses.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to a portable terminal apparatus including:

an access portion that enables access to an information processing apparatus;

an image obtaining portion that obtains an image of a character input tool upon receipt of a request from the information processing apparatus being accessed by the portable terminal apparatus, the character input tool being installed on the portable terminal apparatus, the character input tool having a plurality of character keys;

a transmitter that transmits the image of the character input tool to the information processing apparatus, the image being obtained by the image obtaining portion;

a receiver that receives touched key information from the information processing apparatus when a user touches a character key of the character input tool displayed on a touch-panel display portion of the information processing apparatus, the touch-panel display portion displaying the image of the character input tool along with a character input area, the image being transmitted to the information processing apparatus by the transmitter; and a character identification portion that identifies a character on the basis of the touched key information received by the receiver, the character corresponding to the touched character key, wherein the image obtaining portion obtains a different image of the character input tool upon each change to a screen appearance of the character input tool or upon each receipt of the touched key information and the transmitter transmits the different image of the character input tool and character information to the information processing apparatus, the different image being obtained by the image obtaining portion, the character information representing the character identified by the character identification portion.

A second aspect of the present invention relates to an information processing apparatus including:

an access portion that enables access to a portable terminal apparatus;

a touch-panel display portion that displays at least a character input area allowing character input;

a request transmitter that transmits a request for an image of a character input tool to the portable terminal apparatus being accessed by the information processing apparatus, the character input tool being installed on the portable terminal apparatus, the character input tool having a plurality of character keys;

a receiver that receives the image of the character input tool from the portable terminal apparatus;

a display controller that allows the touch-panel display portion to display the image of the character input tool along with the character input area, the image being received by the receiver; and a transmitter that transmits touched key information to the portable terminal apparatus when a user touches a character key of the character input tool displayed on the touch-panel display portion, wherein:

the receiver receives a different image of the character input tool and character information from the portable terminal apparatus upon each change to a screen appearance of the character input tool or upon each receipt of the touched key information, the different image being obtained by the portable terminal apparatus, the character information representing a character identified by the portable terminal apparatus on the basis of the touched key information, the character corresponding to the touched character key; and the display controller updates the character input tool displayed on the touch-panel display portion upon receipt of the different image of the character input tool from the portable terminal apparatus and puts the character in the character input area upon receipt of the character information from the portable terminal apparatus, the character being represented by the character information.

A third aspect of the present invention relates to a character input method to be implemented by a character input system including an information processing apparatus and a portable terminal apparatus being capable of accessing each other, the character input method including the following steps of the information processing apparatus:

essentially displaying a character input area on a touch-panel display portion, the character input area allowing character input;

transmitting a request for an image of a character input tool to the portable terminal apparatus being accessed by the information processing apparatus, the character input tool being installed on the portable terminal apparatus, the character input tool having a plurality of character keys;

receiving the image of the character input tool from the portable terminal apparatus;

allowing the touch-panel display portion to display the received image of the character input tool along with the character input area; and transmitting touched key information to the portable terminal apparatus when a user touches a character key of the character input tool displayed on the touch-panel display portion, the character input method further including the following steps of the portable terminal apparatus:

obtaining the image of the character input tool installed on the portable terminal apparatus;

transmitting the obtained image of the character input tool to the information processing apparatus;

receiving the touched key information from the information processing apparatus; and identifying a character on the basis of the received touched key information, the character corresponding to the touched character key, wherein:

a different image of the character input tool is obtained upon each change to a screen appearance of the character input tool or upon each receipt of the touched key information and the obtained different image and character information are transmitted to the information processing apparatus, the character information representing the identified character; and the character input tool displayed on the touch-panel display portion is updated upon receipt of the different image of the character input tool from the portable terminal apparatus and the character is put in the character input area upon receipt of the character information from the portable terminal apparatus, the character being represented by the character information.

A fourth aspect of the present invention relates to a non-transitory computer-readable recording medium storing a character input program for a computer of an information processing apparatus to execute:

enabling access to a portable terminal apparatus;

displaying at least a character input area on a touch-panel display portion, the character input area allowing character input;

transmitting a request for an image of a character input tool to the portable terminal apparatus being accessed by the information processing apparatus, the character input tool being installed on the portable terminal apparatus, the character input tool having a plurality of character keys;

receiving the image of the character input tool from the portable terminal apparatus;

allowing the touch-panel display portion to display the received image of the character input tool along with the character input area; and transmitting touched key information to the portable terminal apparatus when a user touches a character key of the character input tool displayed on the touch-panel display portion, wherein:

a different image of the character input tool and character information are received from the portable terminal apparatus upon each change to a screen appearance of the character input tool or upon each receipt of the touched key information, the different image being obtained by the portable terminal apparatus, the character information representing a character identified by the portable terminal apparatus on the basis of the touched key information, the character corresponding to the touched character key; and the character input tool displayed on the touch-panel display portion is updated upon receipt of the different image of the character input tool from the portable terminal apparatus and the character is put in the character input area upon receipt of the character information from the portable terminal apparatus, the character being represented by the character information.

A fifth aspect of the present invention relates to a non-transitory computer-readable recording medium storing a character input program for a computer of a portable terminal apparatus to execute:

enabling access to an information processing apparatus;

obtaining an image of a character input tool upon receipt of a request from the information processing apparatus being accessed by the portable terminal apparatus, the character input tool being installed on the portable terminal apparatus, the character input tool having a plurality of character keys;

transmitting the obtained image of the character input tool to the information processing apparatus;

receiving touched key information from the information processing apparatus when a user touches a character key of the character input tool displayed on a touch-panel display portion of the information processing apparatus, the touch-panel display portion displaying the image of the character input tool along with a character input area, the image being transmitted to the information processing apparatus; and identifying a character on the basis of the received touched key information, the character corresponding to the touched character key, wherein a different image of the character input tool is obtained upon each change to a screen appearance of the character input tool or upon each receipt of the touched key information and the obtained different image and character information are transmitted to the information processing apparatus, the character information representing the identified character.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying drawings, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, an embodiment of the present invention will be described with reference to the accompanying drawings.

Figure 1:
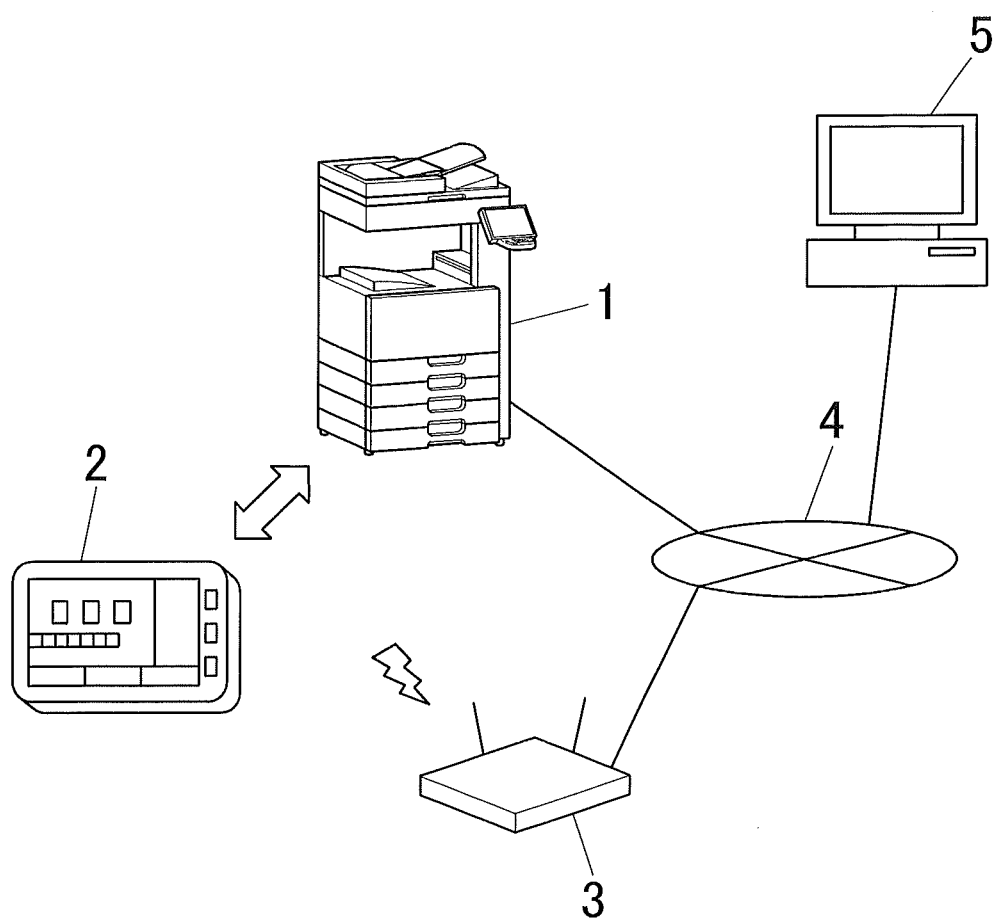
FIG. 1 illustrates a configuration of a character input system according to one embodiment of the present invention.

FIG. 1 illustrates a configuration of a character input system according to one embodiment of the present invention.

The character input system is provided with an image processing apparatus 1 serving as an information processing apparatus and a portable terminal apparatus 2 such as a smartphone or a tablet computer terminal; the image processing apparatus 1 and the portable terminal apparatus 2 are mutually connected through the intermediation of a wireless LAN router 3 and a network 4 such that they are capable of accessing each other. Alternatively, the image processing apparatus 1 and the portable terminal apparatus 2 may be mutually connected in a physical manner by near field communication technology. A personal computer 5 is connected to the network 4.

In this embodiment, the image processing apparatus 1 serves as an information processing apparatus; alternatively, a personal computer, for example, may serve as an information processing apparatus.

More specifically, in this embodiment, a MFP, having various functions such as copier function, printer function, scanner function, and facsimile function, serves as the image processing apparatus 1. Hereinafter, the image processing apparatus will also be referred to as "MFP". The portable terminal apparatus will also be referred to as "portable terminal" or, more simply, "terminal".

Figure 2:
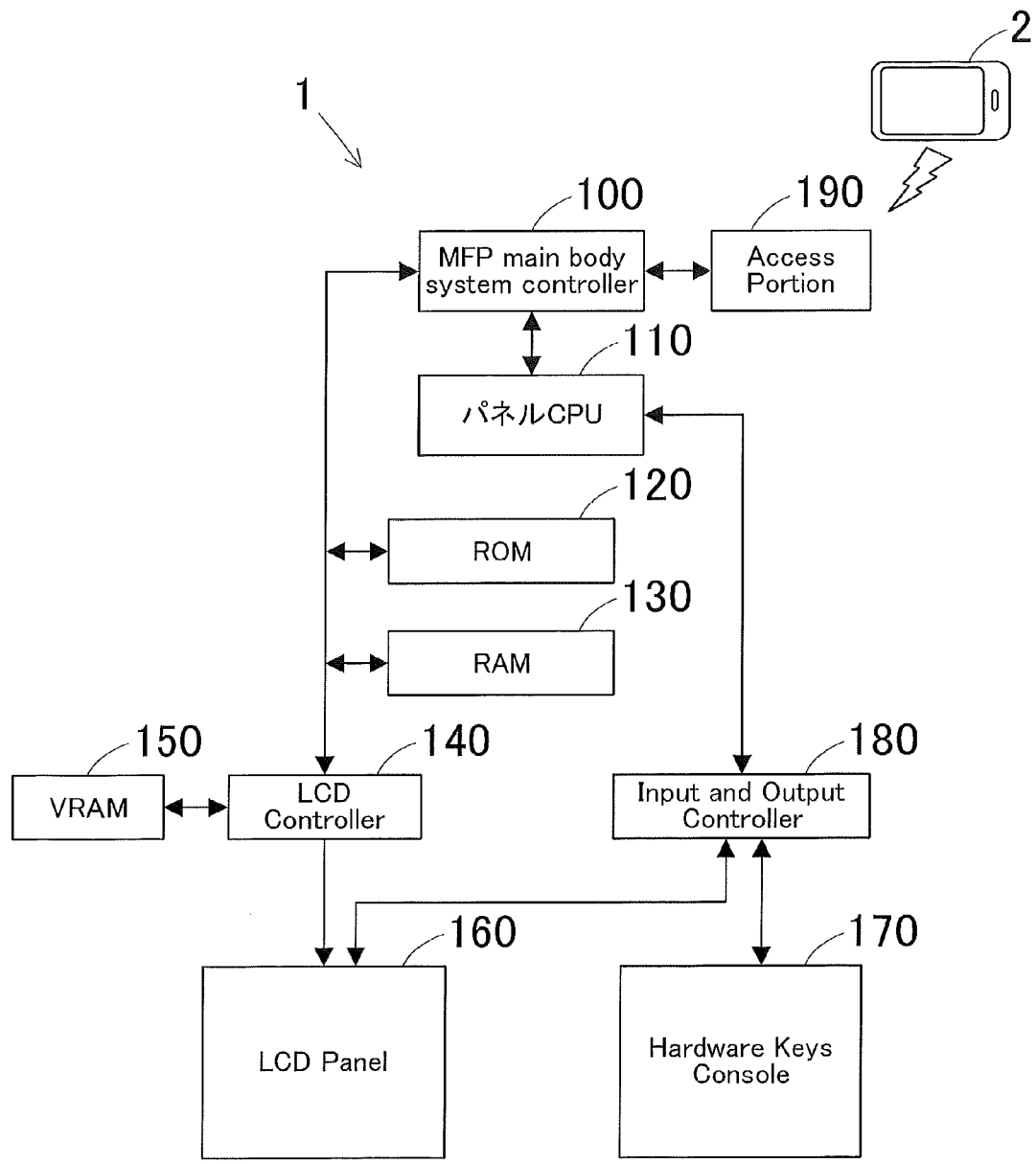
FIG. 2 is a block diagram of a substantial part of an information processing apparatus.

FIG. 2 is a block diagram illustrating a substantial part of the MFP 1. As illustrated in FIG. 2, the MFP 1 is provided with a MFP main body system controller 100, a panel CPU 110, a ROM 120, a RAM 130, a LCD controller 140, a VRAM 150, a LCD panel 160, a hardware keys console 170, an input and output controller 180, and a connector 190.

The MFP main body system controller 100 controls the MFP 1 in a unified and systematic manner. The MFP main body system controller 100 is provided with a main CPU (not shown in this figure) and implements various functions such as copier function, printer function, facsimile function, and scanner function as instructed by users.

The panel CPU 110 controls the entire manipulating system in communicating with the MFP main body system controller 100. The ROM 120 stores operation programs for the panel CPU 110, image data including screen data of screens to be displayed on the LCD panel 160, and other data. The RAM 130 provides a work area for the panel CPU 110 to perform processing in accordance with the operation programs stored on the ROM 120.

The LCD controller 140 controls the read and write operations of the VRAM 150 and controls the display operation of the LCD panel 160. Specifically, as instructed by the panel CPU 110, the LDC controller 140 obtains image data from the ROM 120 to write in the VRAM 150 then retrieves them from the VRAM 150 to display on the LCD panel 160.

The LCD panel 160 is comprised of a liquid-crystal display (LCD) device having touch panel functionality and displays various screens, messages, and other information. Specifically, in this embodiment, the LCD panel 160 displays character input areas for users to input characters such as user names and passwords to log onto the MFP 1 and also displays a character input area for users to input strings for string search.

The hardware keys console 170 is essentially comprised of the following portions: a hardware keyboard having a start key, a numeric keypad, a panel reset key, and other keys; a LED indicating the status of the MFP 1; and a beeper that emits beep tones confirming that the hardware keyboard or the LCD panel 160 accepts input and output manipulations.

The input and output controller 180 detects a user physically touching on the LCD panel 160, judges the touch position, transfers to the panel CPU 110 a notification of a function option selected from those displayed on a screen, and controls the input and output operations in accordance with the function and other settings. Furthermore, the input and output controller 180 controls the hardware keys console 170 and communicates with the MFP main body system controller 100 through the intermediation of the panel CPU 110 as the need arises.

It should be noted that, upon pressure on the start key of the hardware keys console 170, a notice of the event is transferred to the MFP main body system controller 100 through the input and output controller 180 and the panel CPU 110; in this way, the MFP 1 is allowed to start a copy procedure.

The connector 190 is an interface for accessing the portable terminal 2. By accessing the portable terminal 2, the connector 190 allows the MFP 1 to perform interactive data communications with the portable terminal 2.

Figure 3:
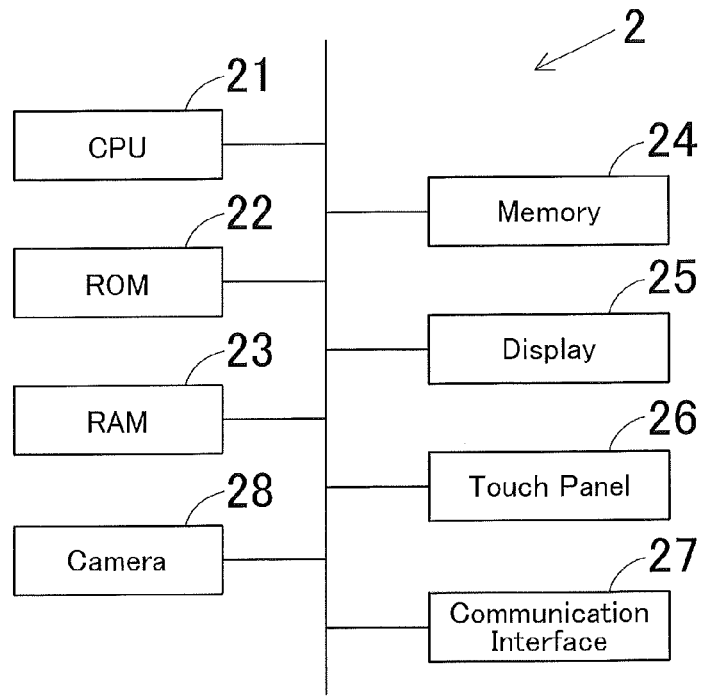
FIG. 3 is a block diagram illustrating a configuration of a portable terminal apparatus.

FIG. 3 is a block diagram illustrating a configuration of the portable terminal 2.

The portable terminal 2 is essentially provided with a CPU 21, a ROM 22, a RAM 23, a memory 24, a display 25, a touch panel 26, a communication interface (communication IF) 27, and a camera 28.

The CPU 21 controls the portable terminal 2 in a unified and systematic manner as instructed by an operating system (OS), an application (also will be abbreviated as "app") for accessing the MFP 1, character input assistant software (also will be referred to as "IME"), and other various apps. The control operations will be later described in detail.

The ROM 22 is a memory that stores operation programs for the CPU 21 and other data; the RAM 23 is a memory that provides a work area for the CPU 21 to execute the operation programs.

The memory 24 is a memory that stores the OS, the app for accessing the MFP 1, an IME, and other data.

The display 25 displays operation screens, messages, an IME-based character input tool such as a software keyboard for character input, and other elements for user manipulation, as well as various images such as images on Websites and photos taken by camera; the display 25 is comprised of a liquid-crystal display device, for example. The touch panel 26, which is provided on the surface of the display 25, detects user's touch events including gestures and identifies coordinates of the position at which the user touches.

The communication interface 27 supports telephone calls through a telephone circuit and supports wireless data communications with the MFP 1 and other external apparatuses via an access point. The camera 28 serves to take photos of various objects.

Figure 4:
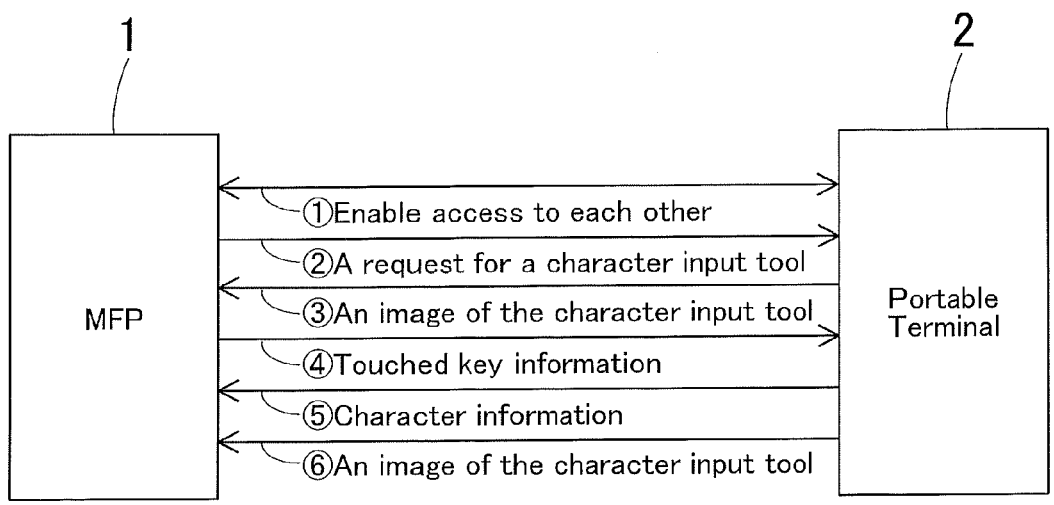
FIG. 4 illustrates how the information processing apparatus and the portable terminal apparatus exchange data with each other in the character input system of FIG. 1.

Hereinafter, the operations of the image processing system of FIG. 1 will be briefly described with reference to FIG. 4 which illustrates how the MFP 1 and the portable terminal 2 exchange data with each other.

To start with, the user enables access between the MFP 1 and the portable terminal 2 (circled number 1); the MFP 1 transmits a request for a character input tool to the portable terminal 2 (circled number 2). Upon receipt of the request, the portable terminal 2 starts an IME installed on the portable terminal 2 itself and captures (snapshots) an image of an IME-based character input tool. The portable terminal 2 then transfers the captured image to the MFP 1 (circled number 3). The user is familiar to this character input tool because he/she usually uses it on the portable terminal 2.

Upon receipt of the image of the character input tool from the portable terminal 2, the MFP 1 displays it on the LCD panel 160. When the user touches (presses) a character key of the character input tool displayed on the LCD panel 160, the MFP 1 transmits touched key information representing coordinates of the touched character key, for example, to the portable terminal 2 (circled number 4).

The portable terminal 2 identifies the character corresponding to the touched character key by analyzing the touched key information received from the MFP 1. The portable terminal 2 then transmits character information (character code) representing the identified character to the MFP 1 (circled number 5). Upon receipt of the character information, the MFP 1 puts and displays the character represented by the character information in a character input area.

When the user touches a character key of the character input tool displayed on the portable terminal 2, there is a change to the screen appearance of the character input tool and the portable terminal 2 needs to reflect this change to the LCD panel 160 of the MFP 1. So, the portable terminal 2 obtains a capture image of the character input tool and transfers it to the MFP 1 upon each receipt of the touched key information from the MFP 1 or upon each change to the screen appearance of the character input tool (circled number 6). Upon each receipt of an image of the character input tool, the MFP 1 updates the character input tool displayed on the LCD panel 160.

As described above, the user can input characters only by operating the MFP 1; furthermore, the user can input characters with the character input tool that they usually use on the portable terminal 2.

Hereinafter, the operations of the MFP 1 and the operations of the portable terminal 2 will be described.

Figure 5:
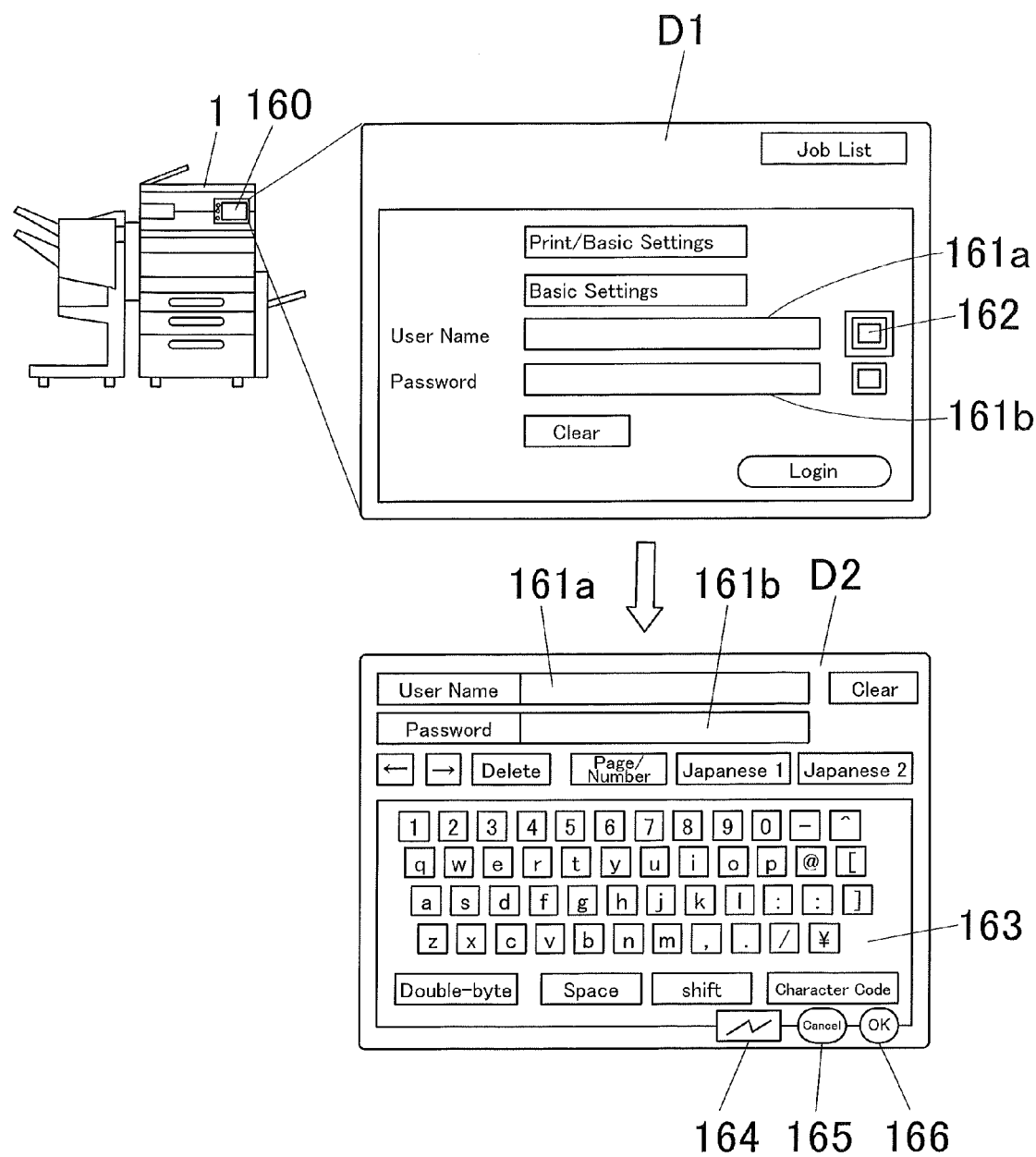
FIG. 5 is a view to explain the operations of the information processing apparatus.

Referring to FIG. 5, on the LCD panel 160, the MFP 1 displays an input screen D1 having character input areas. In the example of FIG. 5, the input screen D1 has a character input area 161*a* for user name input and a character input area 161*b* for password input.

The user then starts a MFP access app installed on the portable terminal 2 to enable access between the MFP 1 and the portable terminal 2. Specifically, to enable access to the MFP 1, the user inputs an IP address and an identification number of the MFP 1, for example, in an access information input area 251 and presses an OK button on an access screen D3 in FIG. 6.

Back to FIG. 5, when the user touches the character input area 161*a* or an icon 162 next to the character input area 161*a*, for example, on the input screen D1 of the MFP 1, the screen is switched to a screen D2. The screen D2 shows the character input areas 161*a* and 161*b* in its upper part and shows a character input tool 163, which is comprised of a software keyboard, under the character input areas 161*a* and 161*b*. The user is unfamiliar to the character input tool 163 because it is an original IME-based character input tool installed on the MFP 1. On and along the lower border of the character input tool 163, the screen D2 also shows an IME start key 164 for starting an IME of the portable terminal 2, a cancel key 165 for cancellation of character input, and an OK key 166 for submitting input characters.

The IME start key 164 starts an IME installed on the portable terminal 2 to transmit a request for an image of the IME-based character input tool 163 to the portable terminal 2. Referring to FIG. 5, when the user touches the IME start key 164 on the screen D2, the MFP 1 transmits a request for an image of the character input tool 163 to the portable terminal 2.

Figure 6:
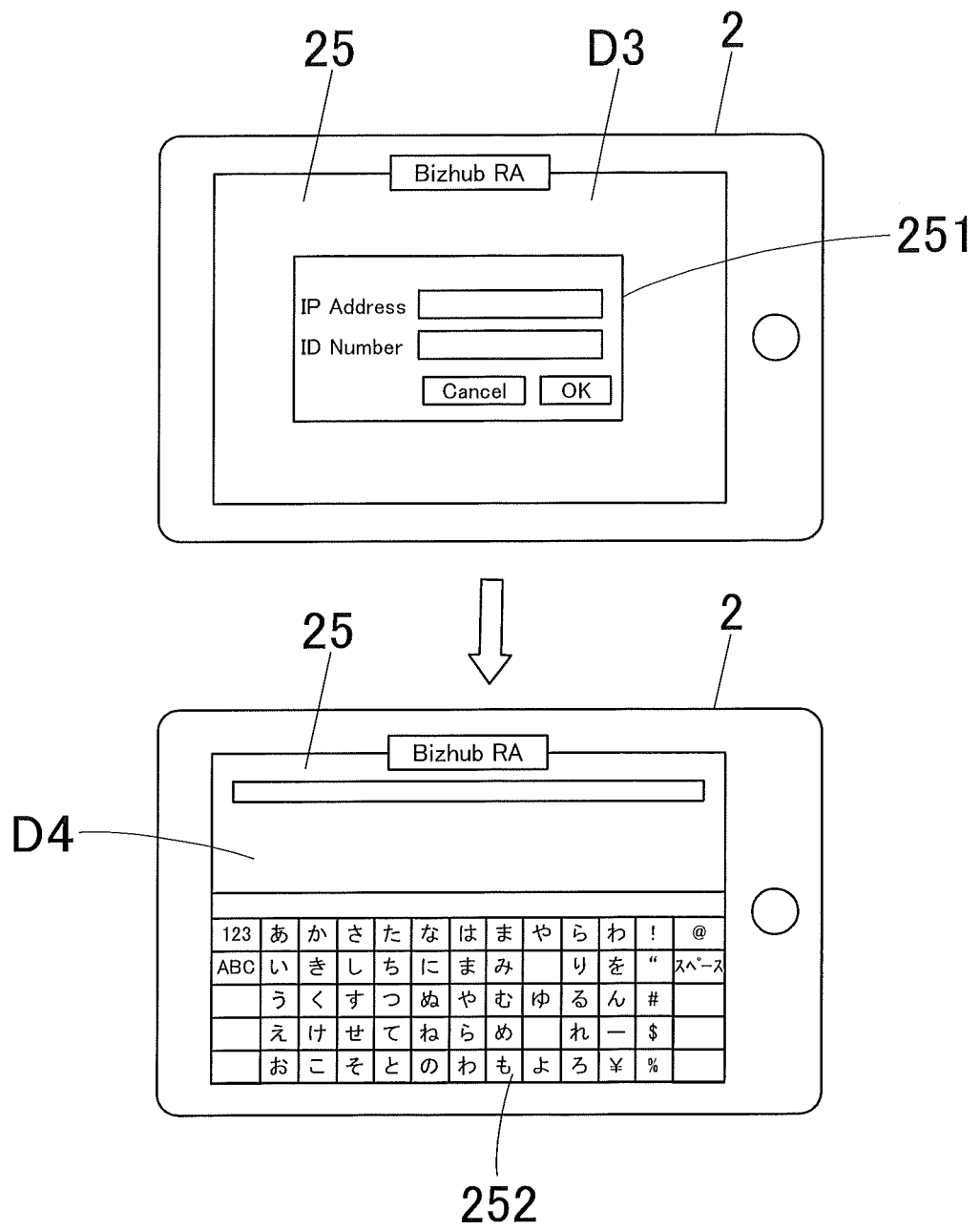
FIG. 6 is a view to explain the operations of the portable terminal apparatus.

Upon receipt of the request, the portable terminal 2 starts the IME installed on the portable terminal 2 itself and displays a screen D4 including an IME-based character input tool 252, on the display 25, as instructed by the MFP access app. In the example of FIG. 6, the character input tool 252 is a Japanese software keyboard having a plurality of Japanese character keys; alternatively, it may be a handwriting input tool or a numeric keypad, for example.

The portable terminal 2 obtains a captured image of the character input tool 252 presently displayed on the display 25, then transfers the captured image to the MFP 1. The portable terminal 2 obtains a captured image of the character input tool 252 as described in further detail below.

Figure 7:
FIG. 7 illustrates a character input tool that appears on the portable terminal apparatus.

After capturing an image displayed on the display 25, the portable terminal 2 clips only a keyboard part of the character input tool 252 out of the captured image as illustrated in FIG. 7. The portable terminal 2 transfers the clipped image, only the keyboard part of the character input tool 252, to the MFP 1. Compressing the clipped image before transfer would be preferred to save communication traffic. In this example, the portable terminal 2 obtains a captured image of the character input tool 252 presently displayed on the display 25. Alternatively, the portable terminal 2 may be allowed to obtain it without the character input tool 252 being displayed on the display 25; in such a case, the character input tool 252 is not necessarily displayed on the display 25.

The MFP 1 receives the clipped image from the portable terminal 2 and, if it is compressed, subjects it to decompression. The MFP 1 then displays the clipped image, instead of the character input tool 163, on the LCD panel 160. It is preferred that the clipped image be enlarged to the screen size of the LCD panel 160 such that the MFP 1 can display the keyboard part of the character input tool 252 on the LCD panel 160, being properly fitted to the LCD panel 160. To achieve this, the MFP 1 needs to have a precise enlargement factor of the clipped image. So, if the clipped image is compressed, the portable terminal 2 should have transferred the clipped image to the MFP 1 along with original size information of the clipped image.

Figure 8:
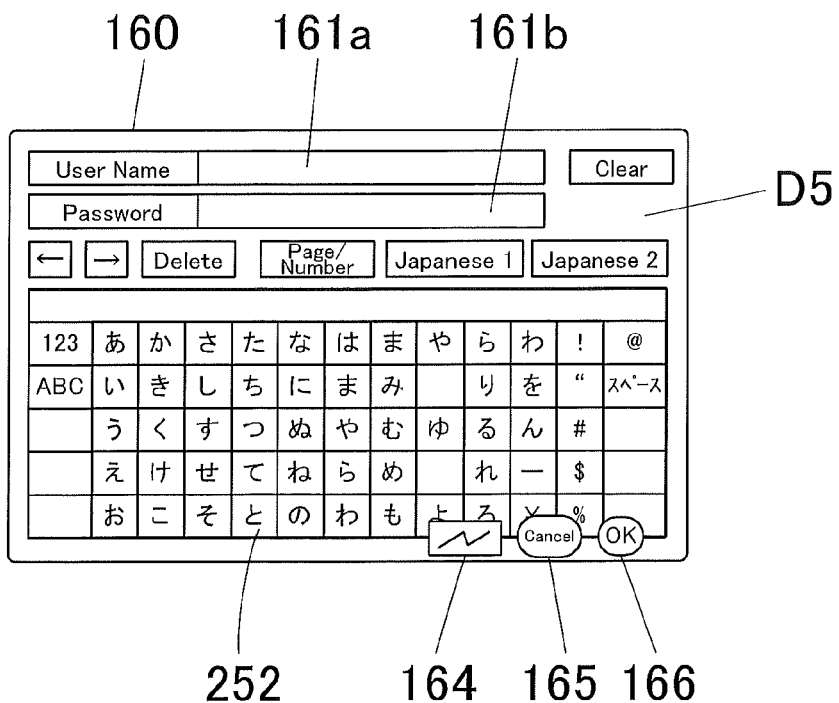
FIG. 8 illustrates how the character input tool of FIG. 7 appears on a display of the information processing apparatus.

FIG. 8 illustrates how the character input tool 252 installed on the portable terminal 2 appears on the LCD panel 160 of the MFP 1. A screen D5 shows the character input tool 252 installed on the portable terminal 2 under character input areas 161*a* and 161*b* for user name input and for password input, respectively. On and along the lower border of the character input tool 252, the screen D5 also shows an IME start key 164 for starting an IME of the portable terminal 2, a cancel key 165, and an OK key 166.

The user inputs characters with the character input tool 252 installed on the portable terminal 2 and displayed on the MFP 1. When the user touches a character key of the character input tool 252, the MFP 1 transmits touched key information to the portable terminal 2 as described above. If the character input tool 252 appears in an enlarged manner, the MFP 1 corrects the touched key information on the basis of the enlargement factor of the character input tool 252 before transmitting it to the portable terminal 2. Without the need of correcting the touched key information, the portable terminal 2 is thus allowed to identify a character with precision by analyzing the touched key information. Alternatively, the portable terminal 2, instead of the MFP 1, may correct the touched key information.

Upon receipt of the touched key information, the portable terminal 2 performs exactly the same operation as it does when the user touches a character key on the portable terminal 2. Specifically, the portable terminal 2 identifies a character by analyzing the touched key information. The portable terminal 2 then returns character information (character code) representing the identified character to the MFP 1. The MFP 1 puts and displays the character represented by the character information in the character input area.

The MFP 1 may put and display one character in the character input area each time the user touches a character key as described above in this example; alternatively, the MFP 1 may put and display a plurality of characters at one time in the character input area when the user submits them all together.

When the user touches a character key of the character input tool 252 displayed on the MFP 1, the touch is reflected to the corresponding character key of the character input tool 252 displayed on the portable terminal 2. That is, the touch may change the screen appearance of the character input tool 252. For example, referring to FIG. 9, when the user switches the character input tool 252 from Japanese keyboard to alphabetical keyboard and touches the character key "I" as indicated by an arrow, an accent menu 252a having a plurality of suggested accented characters for the character "I" may appear. Furthermore, the touched character key may appear in a different color such that the user can easily see that it is touched.

In this embodiment, any change to the screen appearance of the character input tool 252 displayed on the portable terminal 2 as described above is similarly reflected to the character input tool 252 displayed on the MFP 1.

Specifically, each time the user touches a character key of the character input tool 252 displayed on the MFP 1, in other words, upon each receipt of touched key information from the MFP 1, the portable terminal 2 captures an image of the character input tool 252 whose screen appearance is changed by the touch, and clips only a keyboard part of the character input tool 252 out of the captured image. The portable terminal 2 then transfers the clipped image to the MFP 1. Alternatively, the portable terminal 2 may judge whether or not the screen appearance of the character input tool 252 is changed by the touch; in such a case, the portable terminal 2 transfers the clipped image to the MFP 1 upon a judgment that it is changed by the touch.

Upon each receipt of an image of the character input tool 252, the MFP 1 updates the character input tool 252 displayed on the LCD panel 160.

Figure 9:
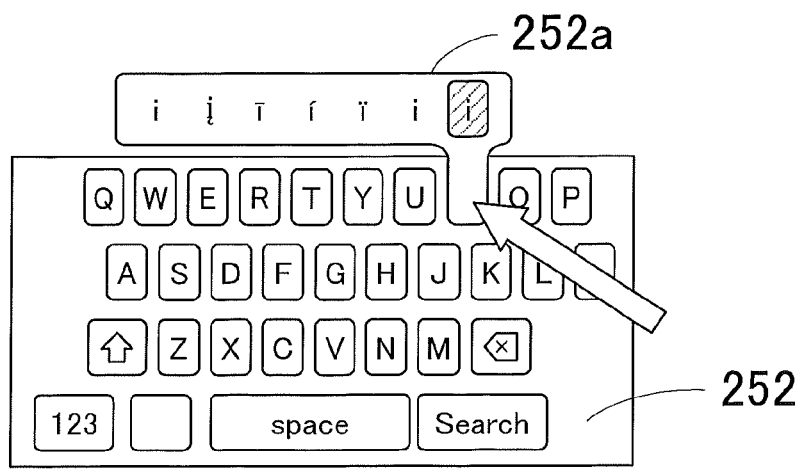
FIG. 9 illustrates another example of a character input tool that appears on the portable terminal apparatus.

In preparation for updating the character input tool 252, the portable terminal 2 may clip only a part of the character input tool 252, which is affected by the touch, out of the captured image of the character input tool 252; for example, the portable terminal 2 may clip only the accent menu 252a of the character input tool 252 in FIG. 9. This would better contribute to the reduction of communication traffic. In such a case, the portable terminal 2 identifies the area of the affected part, i.e., the area of the accent menu 252a, and transfers the clipped image and area information representing the identified area to the MFP 1.

Upon receipt of the clipped image and the area information, the MFP 1 updates the character input tool 252 displayed on the LCD panel 160 by giving the affected part to the area represented by the area information.

The portable terminal 2 may be configured to emit a beep tone when the user touches a character key of the character input tool 252 displayed on the portable terminal 2; in such a case, the MFP 1 emits a beep tone instead of the portable terminal 2. In other words, the character input system may be configured such that, upon receipt of touched key information from the MFP 1, the portable terminal 2 deadens a beep tone that is normally emitted when a user touches the corresponding character key and, upon receipt of character information from the portable terminal 2, the MFP 1 emits a beep tone that is normally emitted when a user touches the corresponding character key of the character input tool 252 displayed on the MFP 1.

Figure 10:
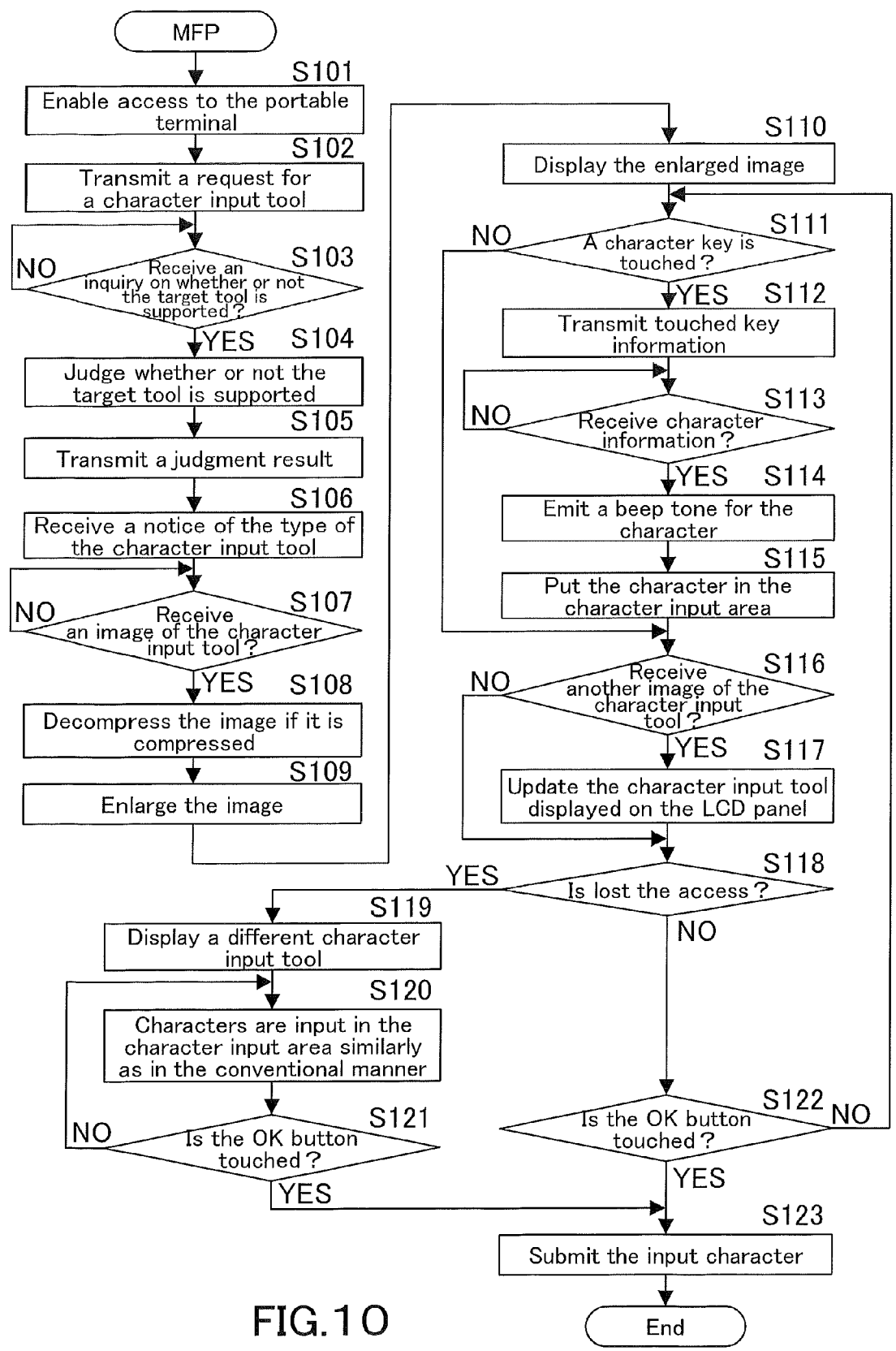
FIG. 10 is a flowchart representing the operations of the information processing apparatus.

FIG. 10 is a flowchart representing the operations of the MFP 1. The MFP 1 performs these operations by the main CPU and the panel CPU 110 of the MFP main body system controller 100, in accordance with operation programs stored on a recording medium such as the ROM 120.

In Step S101, access to the portable terminal 2 is enabled; when the user touches the IME start key 164 for starting the IME of the portable terminal 2, the MFP 1 transmits a request for a character input tool to the portable terminal 2 in Step S102.

In Step S103, the flowchart waits until the MFP 1 receives an inquiry on whether or not the target character input tool is supported from the portable terminal 2 (NO in Step S103). If the MFP 1 receives such an inquiry (YES in Step S103), the MFP 1 then judges whether or not it is supported in Step S104. For example, in the case where the character input tool displayed on the portable terminal 2 is based on an alphabetical character input method, the MFP 1 judges whether or not the alphabetical character input method is supported. In Step S105, the MFP 1 transmits a judgment result to the portable terminal 2. If it is not supported, the MFP 1 transmits, to the portable terminal 2, a notice of character input methods supported on the MFP 1 itself, allowing the portable terminal 2 to use a different character input tool that is supported on the MFP 1.

As described above, if the character input tool installed on the portable terminal 2 is not supported on the MFP 1, the portable terminal 2 selects a different character input tool that is installed on the portable terminal 2 itself and supported on the MFP 1. So, the user can input characters always with a workable character input tool by operating the MFP 1.

In Step S106, the MFP 1 receives a notice of the type of the selected character input tool from the portable terminal 2; in Step S107, the flowchart waits until the MFP 1 receives an image of the character input tool from the portable terminal 2 (NO in Step S107). If the MFP 1 receives an image of the character input tool (YES in Step S107), the MFP 1 subjects the image to decompression, if it is compressed, in Step S108 then enlarges it to the screen size of the LCD panel 160 in Step S109. In Step S110, the MFP 1 displays the enlarged image of the character input tool on the LCD panel 160.

In Step S111, the MFP 1 judges whether or not a character key of the character input tool is touched by the user. If it is touched (YES in Step S111), the flowchart proceeds to Step S112 in which the MFP 1 corrects touched key information, including coordinates of the touched character key, on the basis of the enlargement factor of the image of the character input tool, and transfers it to the portable terminal 2. The flowchart then waits until the MFP 1 receives character information from the portable terminal 2 (NO in Step S113). If the MFP 1 receives character information (YES in Step S113), the flowchart proceeds to Step S114 in which the MFP 1 emits a beep tone for a character represented by the character information, which is normally emitted when a user touches the corresponding character key of the character input tool displayed on the MFP 1. In Step S115, the MFP 1 puts and displays a character represented by the character information in the character input area. The flowchart then proceeds to Step S116. Back to Step S111, if no character key is touched (NO in Step S111), the flowchart proceeds to Step S116.

In Step S116, the flowchart waits until the MFP 1 receives another image of the character input tool; if the MFP 1 receives another image of the character input tool (YES in Step S116), the MFP 1 updates the character input tool 252 displayed on the LCD panel 160 in Step S117. The flowchart then proceeds to Step S118. In Step S116, if the MFP 1 does not receive another image of the character input tool (NO in Step S116), the flowchart proceeds directly to Step S118.

In Step S118, the MFP 1 judges whether or not the access to the portable terminal 2 is lost. If the access is still maintained (NO in Step S118), the MFP 1 then judges whether or not the OK key 166 is touched in Step S122. If the OK key 166 is not touched (NO in Step S118), the flowchart returns to Step S111. If the OK key 166 is touched (YES in Step S122), the MFP 1 submits the character put in the character input area to finish character input, in Step S123.

In Step S118, if the access is lost (YES in Step S118), the MFP 1 displays a different character input tool installed on the MFP 1 itself in Step S119. Specifically, the MFP 1 displays a different character input tool with reference to the notice of the type of the character input tool, which is received from the portable terminal 2, in Step S106. For example, the MFP 1 displays a Japanese keyboard as the character input tool before losing the access and displays a different Japanese keyboard that is installed on the MFP 1 itself after losing the access. This allows the user to continue character input without any trouble even after losing the access to the portable terminal 2.

After that, in Step S120, the user continues character input with the different character input tool similarly as in the conventional manner.

In Step S121, the MFP 1 judges whether or not the OK key 166 is touched; if the OK key 166 is not touched (NO in Step S121), the flowchart returns to Step S120. If the OK key 166 is touched (YES in Step S121), the MFP 1 confirms the character put in the character input area to finish character input, in Step S123.

Figure 11:
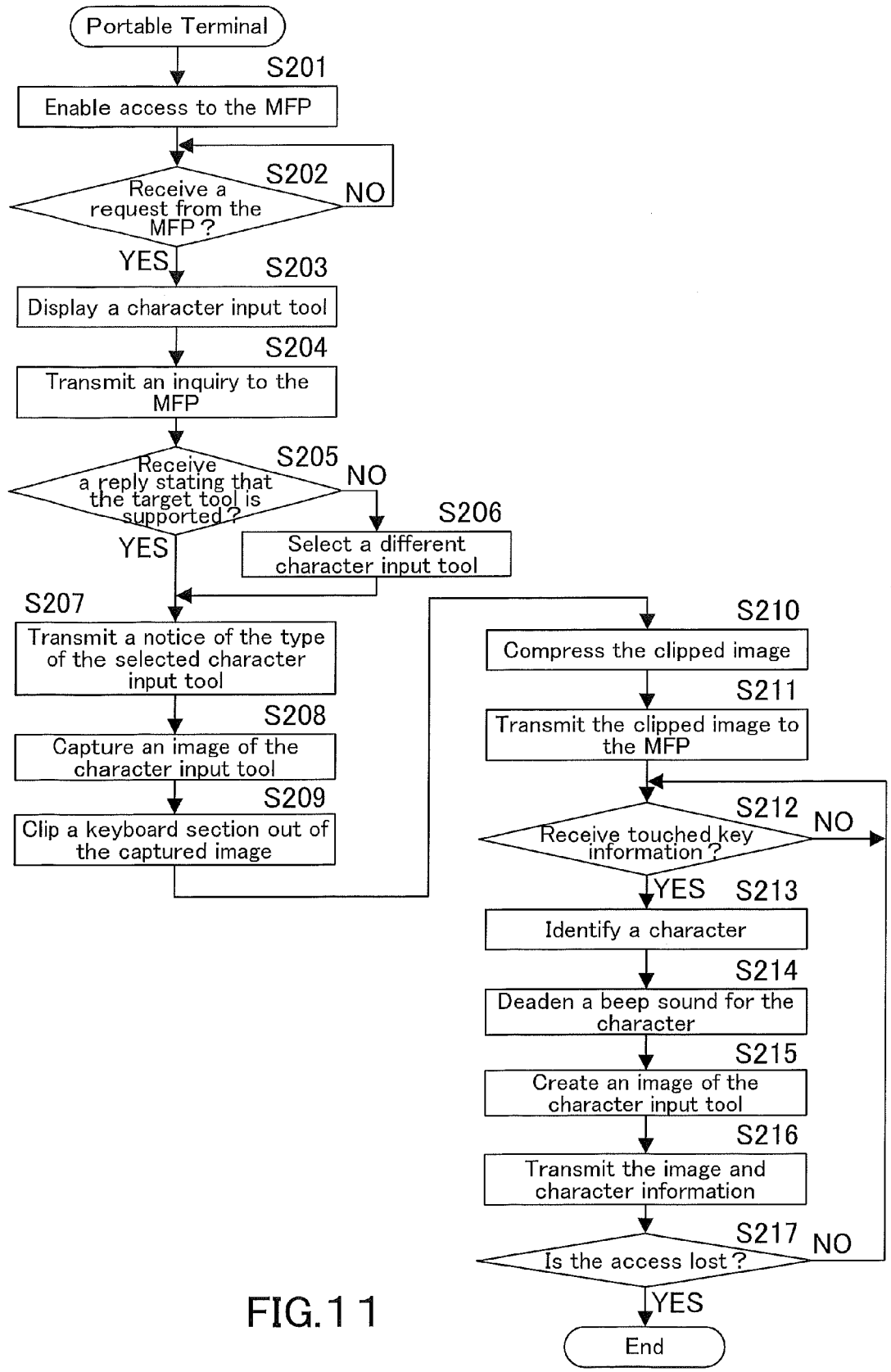
FIG. 11 is a flowchart representing the operations of the portable terminal apparatus.
Figure 12:
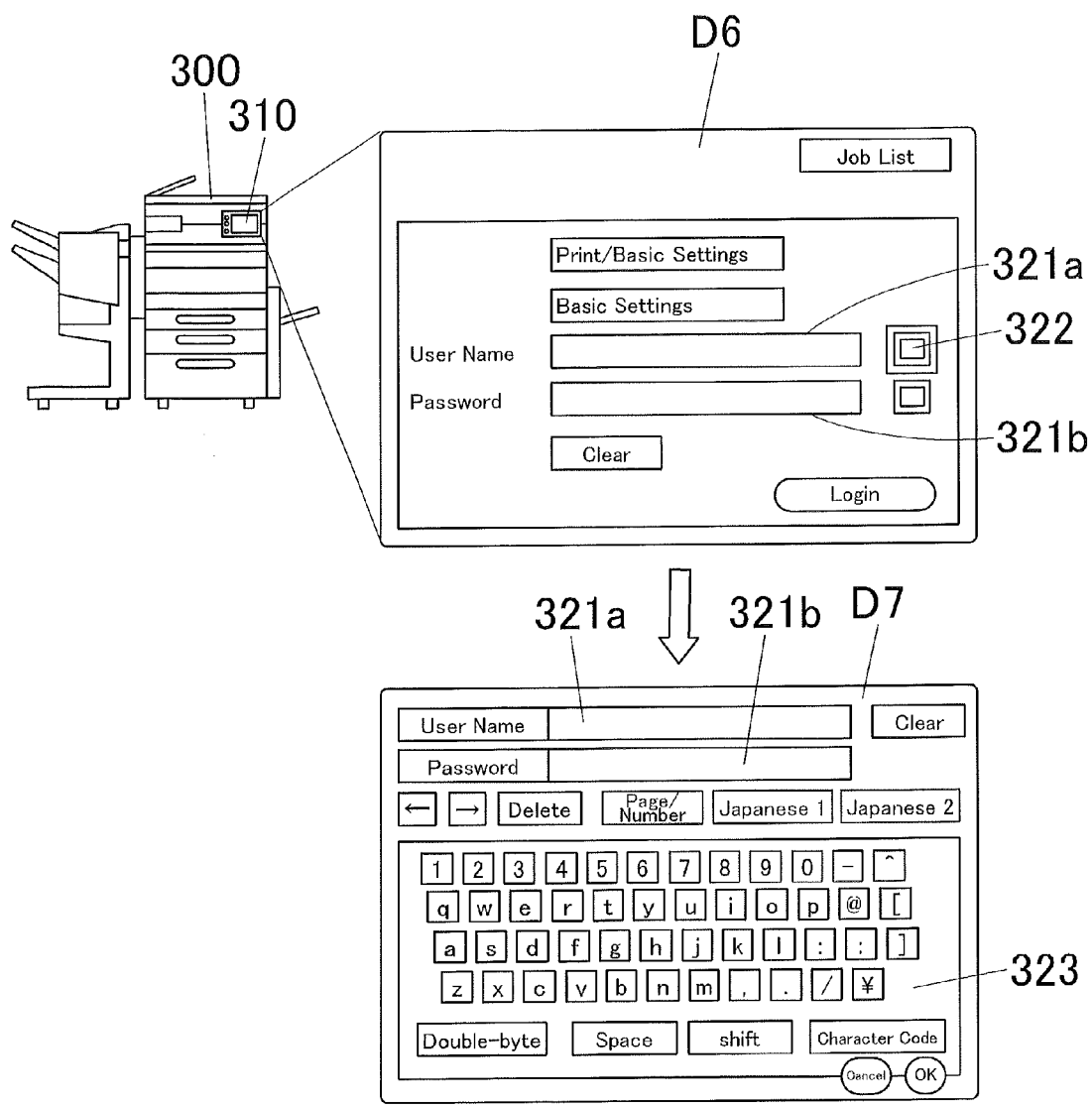
FIG. 12 is a view to explain a character input method that users conventionally have used.

FIG. 11 is a flowchart representing the operations of the portable terminal 2. The flowchart is executed by the CPU 21 of the portable terminal 2 in accordance with operation programs stored on a recording medium such as the ROM 22.

In Step S201, access to the MFP 1 is enabled. In Step S202, the flowchart waits until the portable terminal 2 receives a request for a character input tool from the MFP 1 (NO in Step S202); if the portable terminal 2 receives such a request (YES in Step S202), the flowchart proceeds to Step S203 in which the portable terminal 2 starts an IME installed on the portable terminal 2 itself and displays the IME-based character input tool 252 that the user usually use, on the display 25.

In Step S204, the portable terminal 2 transmits, to the MFP 1, an inquiry on whether or not the target character input tool is supported. In Step S205, if the portable terminal 2 receives, from the MFP 1, a reply stating that it is supported (YES in Step S205), the flowchart proceeds to Step S207. If the portable terminal 2 receives, from the MFP 1, a replay stating that it is not supported (NO in Step S205), the flowchart proceeds to Step S206 in which the portable terminal 2 selects a different character input tool that is installed on the portable terminal 2 itself and supported on the MFP 1, with reference to character input methods provided from the MFP 1, then displays the selected character input tool on the display 25. The flowchart then proceeds to Step S207.

In Step S207, the portable terminal 2 transmits a notice of the type of the selected character input tool to the MFP 1. The portable terminal 2 captures an image of the character input tool 252 displayed on the display 25 in Step S208 and clips a keyboard part of the character input tool 252 out of the captured image in Step S209. The portable terminal 2 compresses the clipped image in Step S210 and transfers the compressed image to the MFP 1 in Step S211.

In Step S212, the flowcharts waits until the portable terminal 2 receives touched key information from the MFP 1; if the portable terminal 2 does not receive it (NO in Step S212), the flowchart waits until the portable terminal 2 receives it. If the portable terminal 2 receives it (YES in Step S212), the portable terminal 2 identifies a character by analyzing the touched key information in Step S213. The portable terminal 2 deadens a beep tone that is normally emitted when a user touches the character key corresponding to the identified character, in Step S214.

In Step S215, the portable terminal 2 creates an image of the character input tool 252 as it does in Steps S208 and S209. In Step S216, the portable terminal 2 compresses the image and transfers the compressed image to the MFP 1 along with character information representing the identified character. The portable terminal 2 transmits an image of the character input tool and character information together to the MFP 1, achieving a simple operation.

In Step S217, the portable terminal 2 judges whether or not the access to the MFP 1 is lost; if it is still maintained (NO in Step S217), the flowchart returns to Step S212. If it is lost (YES in Step S217), the flowchart terminates.

As described above, in this embodiment, while the character input tool 252 installed on the portable terminal 2 is displayed on the LCD panel 160 of the MFP 1, the user can input a character in a character input area of the MFP 1 by touching a character key of the character input tool 252 displayed on the LCD panel 160. The user can input characters only by operating the MFP 1 and does not need to operate the portable terminal 2 at all, thus he/she is not bothered anymore by going back and forth between the MFP 1 and the portable terminal 2. Furthermore, the MFP 1 displays an image of the character input tool 252 on the LCD panel 160 and the user is familiar to the character input tool 27 since it is installed on the portable terminal 2. The user thus can input characters with the character input tool 252 that he/she usually uses on the portable terminal 2. With this configuration, the character input system would be pretty user-friendly.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A portable terminal apparatus comprising:
   an access portion that enables access to an information processing apparatus;
   an image obtaining portion that obtains an image of a character input tool upon receipt of a request from the information processing apparatus being accessed by the portable terminal apparatus, the character input tool being installed on the portable terminal apparatus, the character input tool having a plurality of character keys;
   a transmitter that transmits the image of the character input tool to the information processing apparatus, the image being obtained by the image obtaining portion;
   a receiver that receives touched key information from the information processing apparatus when a user touches a character key of the character input tool displayed on a touch-panel display portion of the information processing apparatus, the touch-panel display portion displaying the image of the character input tool along with a character input area, the image being transmitted to the information processing apparatus by the transmitter; and
   a character identification portion that identifies a character on the basis of the touched key information received by the receiver, the character corresponding to the touched character key,
   wherein the image obtaining portion obtains a different image of the character input tool upon each change to a screen appearance of the character input tool or upon each receipt of the touched key information and the transmitter transmits the different image of the character input tool and character information to the information processing apparatus, the different image being obtained by the image obtaining portion, the character information representing the character identified by the character identification portion.

2. The portable terminal apparatus as recited in claim 1, wherein the transmitter transmits the image of the character input tool and the character information together to the information processing apparatus.

3. The portable terminal apparatus as recited in claim 1, further comprising a compressor that compresses the image of the character input tool, wherein the transmitter transmits the image of the character input tool and an original size of the image of the character input tool to the information processing apparatus, the image being compressed by the compressor.

4. The portable terminal apparatus as recited in claim 1, further comprising:
   an area identification portion that identifies an area affected by a change to the screen appearance of the character input tool; and
   a clipper portion that clips a different image out of the image of the character input tool, the different image residing in the identified area,
   wherein the transmitter transmits the different image clipped by the clipper portion and area information representing the identified area to the information processing apparatus.

5. The portable terminal apparatus as recited in claim 1, further comprising an inquiry transmitter that transmits an inquiry on whether or not the character input tool is supported to the information processing apparatus,
   wherein upon a judgment that the character input tool is not supported, the judgment being made by the information processing apparatus in response to the inquiry from the portable terminal apparatus, the portable terminal apparatus selects a different character input tool that is installed on the portable terminal apparatus itself and supported on the information processing apparatus and the transmitter transmits an image of the selected character input tool to the information processing apparatus.

6. The portable terminal apparatus as recited in claim 1, further comprising a deadening portion that deadens a beep tone, the beep tone being normally emitted when a character key is touched, the character key corresponding to the character identified by the character identification portion.

7. The portable terminal apparatus as recited in claim 1, wherein the portable terminal apparatus transmits a notice of the type of the character input tool, the character input tool being selected by the portable terminal apparatus.

8. A character input system comprising the portable terminal apparatus as recited in claim 1 and an information processing apparatus being capable of accessing the portable terminal apparatus, the information processing apparatus comprising:
   a touch-panel display portion that displays at least a character input area allowing character input;
   a request transmitter that transmits a request for the image of the character input tool to the portable terminal apparatus being accessed by the information processing apparatus, the character input tool being installed on the portable terminal apparatus, the character input tool having a plurality of character keys;
   a receiver that receives the image of the character input tool from the portable terminal apparatus;
   a display controller that allows the touch-panel display portion to display the image of the character input tool along with the character input area, the image being received by the receiver; and
   a transmitter that transmits touched key information to the portable terminal apparatus when a user touches a character key of the character input tool displayed on the touch-panel display portion,
   wherein:
     the image obtaining portion of the portable terminal apparatus obtains a different image of the character input tool upon each change to a screen appearance of the character input tool or upon each receipt of the touched key information and the transmitter transmits the different image of the character input tool and character information to the information processing apparatus, the different image being obtained by the image obtaining portion, the character information representing the character identified by the character identification portion; and
     the display controller of the information processing apparatus updates the character input tool displayed on the touch-panel display portion upon receipt of the different image of the character input tool from the portable terminal apparatus and puts the character in the character input area upon receipt of the character information from the portable terminal apparatus, the character being represented by the character information.

9. The character input system as recited in claim 8, wherein the transmitter of the portable terminal apparatus transmits the image of the character input tool and the character information together to the information processing apparatus.

10. The character input system as recited in claim 8, wherein:
the portable terminal apparatus further comprises a compressor that compresses the image of the character input tool and the transmitter of the portable terminal apparatus transmits the image of the character input tool and an original size of the image of the character input tool to the information processing apparatus, the image being compressed by the compressor; and
the display controller of the information processing apparatus decompresses the compressed image of the character input tool and enlarges the decompressed image to a screen size of the touch-panel display portion.

11. The character input system as recited in claim 10, wherein the information processing apparatus corrects the touched key information on the basis of an enlargement factor of the enlarged image of the character input tool and the transmitter of the information processing apparatus transmits the corrected touched key information to the portable terminal apparatus.

12. The character input system as recited in claim 8, wherein:
the portable terminal apparatus further comprises:
an area identification portion that identifies an area affected by a change to a screen appearance of the character input tool; and
a clipper portion that clips a different area out of the image of the character input tool, the different image residing in the identified area,
wherein:
the transmitter of the portable terminal apparatus transmits the different image clipped by the clipper portion and area information representing the identified area to the information processing apparatus; and
the display controller of the information processing apparatus gives the clipped different image to the identified area of the image of the character input tool presently displayed on the touch-panel display portion, the clipped different image being received from the portable terminal apparatus, the identified area being represented by the area information.

13. The character input system as recited in claim 8, further comprising an inquiry transmitter that transmits an inquiry on whether or not the character input tool is supported to the information processing apparatus,
wherein:
the information processing apparatus further comprises a judgment portion that judges whether or not the character input tool is supported, in response to the inquiry from the portable terminal apparatus; and
upon a judgment that the character input tool is not supported, the judgment being made by the judgment potion of the information processing apparatus, the portable terminal apparatus selects a different character input tool that is installed on the portable terminal apparatus itself and supported on the information processing apparatus and the transmitter of the portable terminal apparatus transmits an image of the selected character input tool to the information processing apparatus.

14. The character input system as recited in claim 8, wherein:
the portable terminal apparatus further comprises a deadening portion that deadens a beep tone, the beep tone being normally emitted when a character key is touched, the character key corresponding to the character identified by the character identification portion; and
the information processing apparatus further comprises a beeper portion that emits a beep tone, the beep tone being normally emitted for a character represented by the character information.

15. The character input system as recited in claim 8, wherein:
the portable terminal apparatus transmits a notice of the type of the character input tool, the character input tool being selected by the portable terminal apparatus; and
upon losing the access to the portable terminal apparatus, the display controller of the information processing apparatus allows the touch-panel display portion to display a different character input tool with reference to the notice from the portable terminal apparatus, the different character input tool being supported on the information processing apparatus.

16. An information processing apparatus comprising:
an access portion that enables access to a portable terminal apparatus;
a touch-panel display portion that displays at least a character input area allowing character input;
a request transmitter that transmits a request for an image of a character input tool to the portable terminal apparatus being accessed by the information processing apparatus, the character input tool being installed on the portable terminal apparatus, the character input tool having a plurality of character keys;
a receiver that receives the image of the character input tool from the portable terminal apparatus;
a display controller that allows the touch-panel display portion to display the image of the character input tool along with the character input area, the image being received by the receiver; and
a transmitter that transmits touched key information to the portable terminal apparatus when a user touches a character key of the character input tool displayed on the touch-panel display portion,
wherein:
the receiver receives a different image of the character input tool and character information from the portable terminal apparatus upon each change to a screen appearance of the character input tool or upon each receipt of the touched key information, the different image being obtained by the portable terminal apparatus, the character information representing a character identified by the portable terminal apparatus on the basis of the touched key information, the character corresponding to the touched character key; and
the display controller updates the character input tool displayed on the touch-panel display portion upon receipt of the different image of the character input tool from the portable terminal apparatus and puts the character in the character input area upon receipt of the character information from the portable terminal apparatus, the character being represented by the character information.

17. The information processing apparatus as recited in claim 16, wherein:
the receiver further receives the image of the character input tool and an original size of the image of the character input tool from the portable terminal apparatus, the image being compressed; and the display controller decompresses the compressed image of the character input tool and enlarges the decompressed image to a screen size of the touch-panel display portion.

18. The information processing apparatus as recited in claim 17, wherein the touched key information is corrected on the basis of an enlargement factor of the enlarged image of the character input tool and the transmitter transmits the corrected touched key information to the portable terminal apparatus.

19. The information processing apparatus as recited in claim 16, wherein:
the receiver receives a different image of the character input tool and area information representing an area affected by a change to the screen appearance of the character input tool, the different image residing in the affected area, the different image being clipped out of the image of the character input tool by the portable terminal apparatus; and
the display controller gives the received different image to the affected area of the image of the character input tool presently displayed on the touch-panel display portion, the affected area being represented by the area information.

20. The information processing apparatus as recited in claim 16, further comprising a judgment portion that judges, in response to an inquiry from the portable terminal apparatus, whether or not the character input tool is supported, wherein the transmitter transmits a judgment result to the portable terminal apparatus, the judgment result being obtained by the judgment portion.

21. The information processing apparatus as recited in claim 16, further comprising a beeper portion that emits a beep tone for a character represented by the character information when the user touches a character key on the portable terminal apparatus, the character key corresponding to the character represented by the character information.

22. The information processing apparatus as recited in claim 16, wherein, upon losing the access to the portable terminal apparatus, the display controller allows the touch-panel display portion to display a different character input tool with reference to a notice provided from the portable terminal apparatus, the different character input tool being installed on the portable terminal apparatus and supported on the information processing apparatus.

23. A character input method to be implemented by a character input system comprising an information processing apparatus and a portable terminal apparatus being capable of accessing each other, the character input method comprising the following steps of the information processing apparatus:
displaying at least a character input area on a touch-panel display portion, the character input area allowing character input;
transmitting a request for an image of a character input tool to the portable terminal apparatus being accessed by the information processing apparatus, the character input tool being installed on the portable terminal apparatus, the character input tool having a plurality of character keys;
receiving the image of the character input tool from the portable terminal apparatus;
allowing the touch-panel display portion to display the received image of the character input tool along with the character input area; and
transmitting touched key information to the portable terminal apparatus when a user touches a character key of the character input tool displayed on the touch-panel display portion,
the character input method further comprising the following steps of the portable terminal apparatus:
obtaining the image of the character input tool installed on the portable terminal apparatus;
transmitting the obtained image of the character input tool to the information processing apparatus;
receiving the touched key information from the information processing apparatus; and
identifying a character on the basis of the received touched key information, the character corresponding to the touched character key,
wherein:
a different image of the character input tool is obtained upon each change to a screen appearance of the character input tool or upon each receipt of the touched key information and the obtained different image and character information are transmitted to the information processing apparatus, the character information representing the identified character; and
the character input tool displayed on the touch-panel display portion is updated upon receipt of the different image of the character input tool from the portable terminal apparatus and the character is put in the character input area upon receipt of the character information from the portable terminal apparatus, the character being represented by the character information.

24. A non-transitory computer-readable recording medium storing a character input program for a computer of an information processing apparatus to execute:
enabling access to a portable terminal apparatus;
displaying at least a character input area on a touch-panel display portion, the character input area allowing character input;
transmitting a request for an image of a character input tool to the portable terminal apparatus being accessed by the information processing apparatus, the character input tool being installed on the portable terminal apparatus, the character input tool having a plurality of character keys;
receiving the image of the character input tool from the portable terminal apparatus;
allowing the touch-panel display portion to display the received image of the character input tool along with the character input area; and
transmitting touched key information to the portable terminal apparatus when a user touches a character key of the character input tool displayed on the touch-panel display portion,
wherein:
a different image of the character input tool and character information are received from the portable terminal apparatus upon each change to a screen appearance of the character input tool or upon each receipt of the touched key information, the different image being obtained by the portable terminal apparatus, the character information representing a character identified by the portable terminal apparatus on the basis of the touched key information, the character corresponding to the touched character key; and
the character input tool displayed on the touch-panel display portion is updated upon receipt of the different image of the character input tool from the portable terminal apparatus and the character is put in the character input area upon receipt of the character information from the portable terminal apparatus, the character being represented by the character information.

25. A non-transitory computer-readable recording medium storing a character input program for a computer of a portable terminal apparatus to execute:

enabling access to an information processing apparatus;

obtaining an image of a character input tool upon receipt of a request from the information processing apparatus being accessed by the portable terminal apparatus, the character input tool being installed on the portable terminal apparatus, the character input tool having a plurality of character keys;

transmitting the obtained image of the character input tool to the information processing apparatus;

receiving touched key information from the information processing apparatus when a user touches a character key of the character input tool displayed on a touch-panel display portion of the information processing apparatus, the touch-panel display portion displaying the image of the character input tool along with a character input area, the image being transmitted to the information processing apparatus; and identifying a character on the basis of the received touched key information, the character corresponding to the touched character key, wherein a different image of the character input tool is obtained upon each change to a screen appearance of the character input tool or upon each receipt of the touched key information and the obtained different image and character information are transmitted to the information processing apparatus, the character information representing the identified character.

* * * * *